Figure 6:
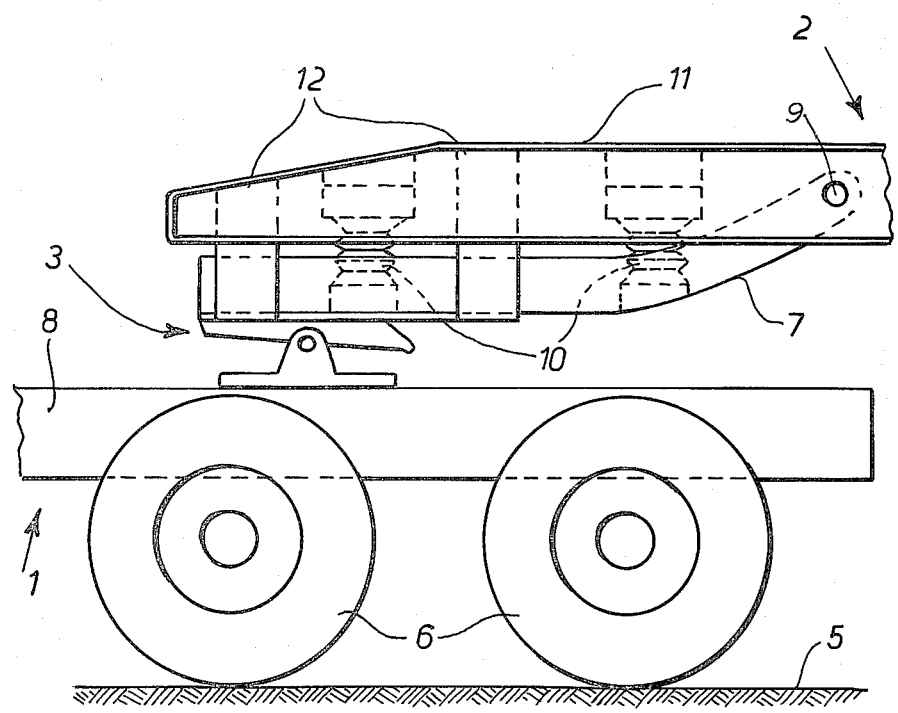

United States Patent [19]
Damm

[11] 3,884,503
[45] May 20, 1975

[54] DEVICE FOR THE INTERCONNECTION OF PULLING VEHICLES AND SEMITRAILER

[76] Inventor: Sverre Damm, Ant. Tschudisvei 25, Oslo 5, Norway

[22] Filed: Jan. 17, 1974

[21] Appl. No.: 434,195

[30] Foreign Application Priority Data
Jan. 24, 1973   Norway.................................. 286/73

[52] U.S. Cl. .............................. 280/440; 280/124 F
[51] Int. Cl............................................... B62d 53/06
[58] Field of Search ................... 280/440, 124 F, 6.1

[56] References Cited
UNITED STATES PATENTS

| | | | |
|---|---|---|---|
| 2,733,931 | 2/1956 | Reid et al..................... | 280/440 UX |
| 2,821,409 | 1/1958 | Chalmers............................ | 280/440 |
| 3,055,677 | 9/1962 | Smith ........................... | 280/124 F X |
| 3,104,679 | 9/1963 | Gouirand..................... | 280/124 F X |
| 3,203,711 | 8/1965 | Chew .............................. | 280/415 B |
| 3,208,770 | 9/1965 | Freitas et al........................ | 280/440 |
| 3,246,906 | 4/1966 | Cahill................................. | 280/6.1 |

*Primary Examiner*—Leo Friaglia
*Attorney, Agent, or Firm*—Morris Liss

[57]   ABSTRACT

Improvement in coupling a semi-trailer to a haulage vehicle said trailer having a plurality of wheel axles arranged one after the other extending over a substantial part of the length of the semi-trailer, which causes an unacceptably great downwardly or upwardly directed force to be exerted on the hauling vehicle when driving on hilly roads. To eliminate said disadvantages the coupling (the fifth wheel) is arranged such that it can be raised and lowered with respect to the frame of the hauling vehicle or, alternatively, to the gooseneck of the semi-trailer, by means of a power device which is adapted to exert a predetermined upwardly directed or downwardly directed force, respectively, on the coupling.

7 Claims, 6 Drawing Figures

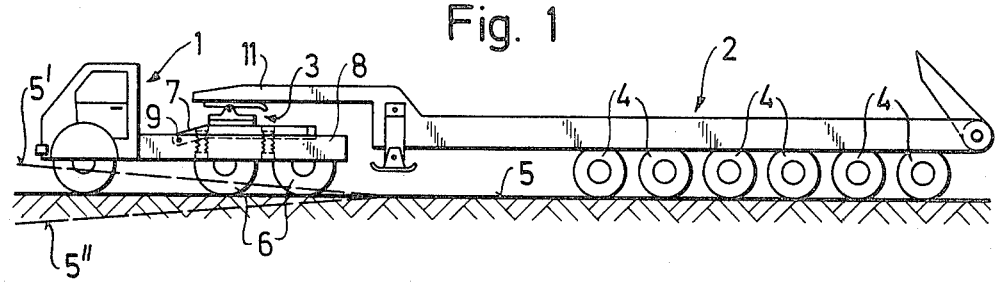
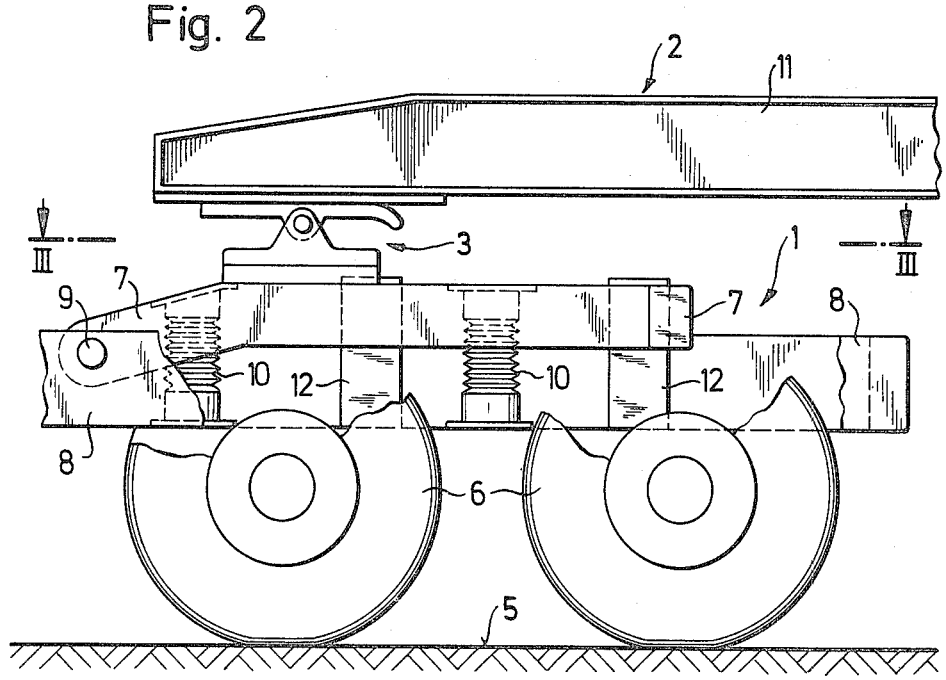
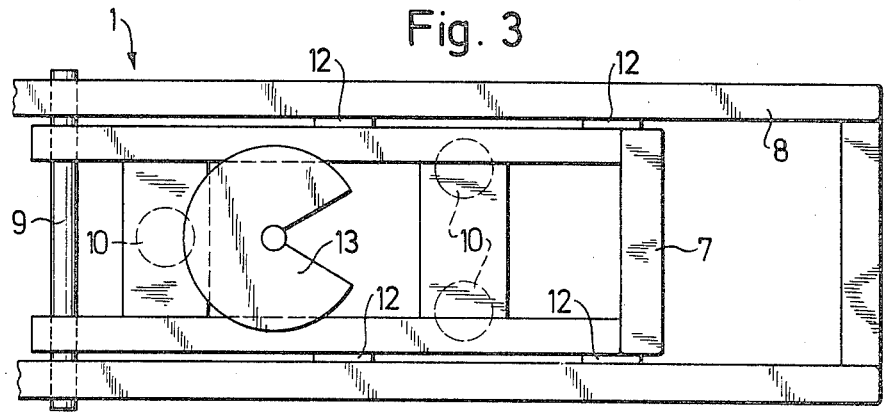

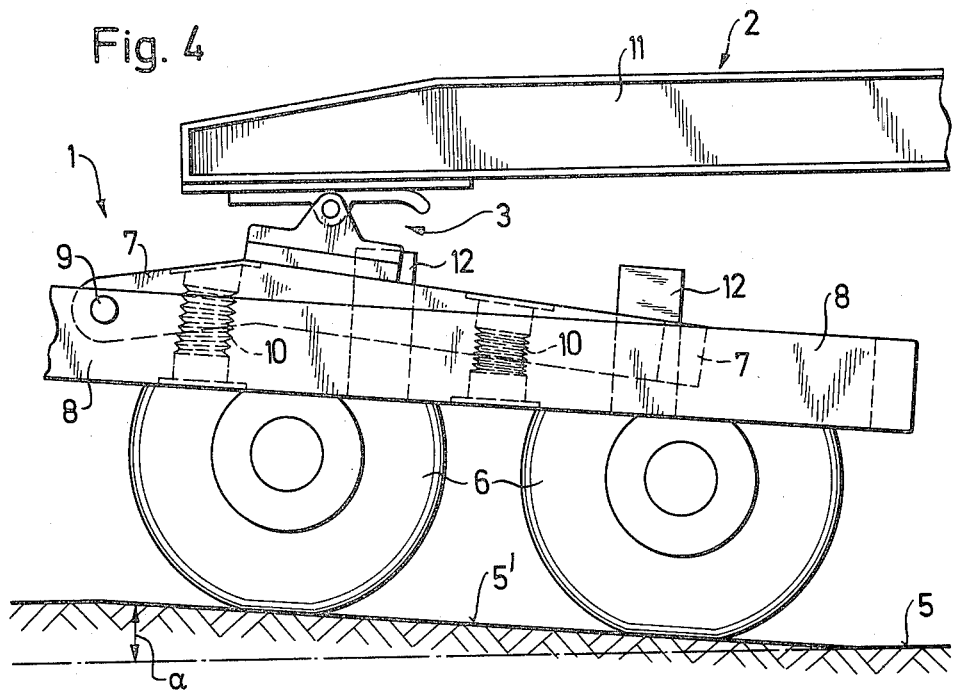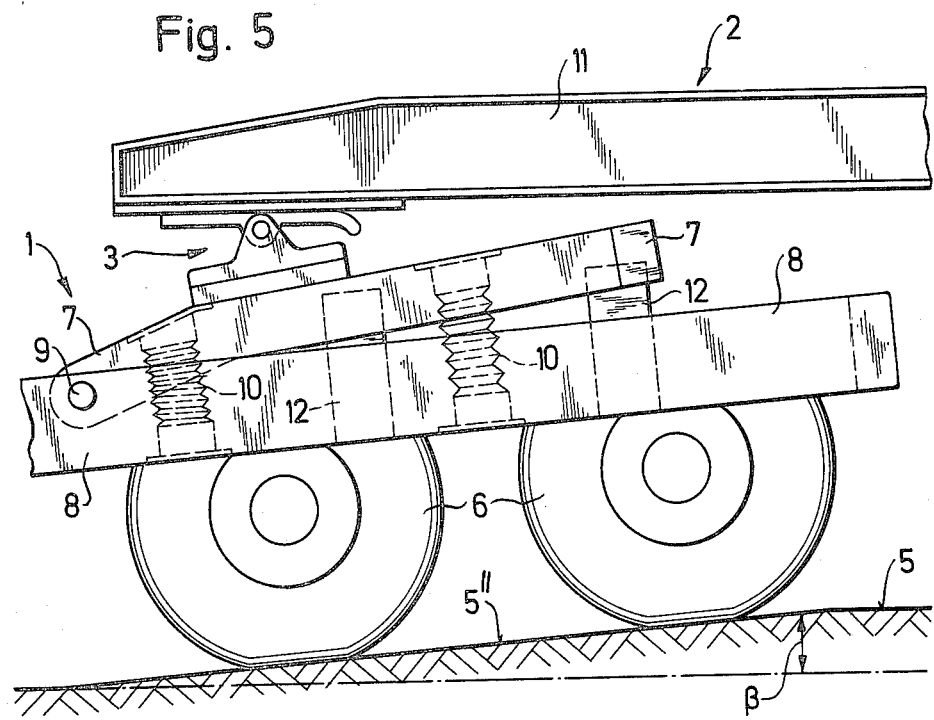

DEVICE FOR THE INTERCONNECTION OF PULLING VEHICLES AND SEMITRAILER

The present invention relates to an improvement in coupling a semi-trailer to a haulage vehicle, said trailer having a plurality of wheel axles arranged one after the other extending over a substantial part of the length of the semi-trailer and, when the said trailer is secured, by means of its coupling component, to the coupling component of the hauling vehicle which includes a rotatable disc (hereinafter called a fifth wheel), and when the vehicle is driven from a horizontal surface onto a downwardly or upwardly inclined surface, an unacceptably great downwardly or upwardly directed force is exerted on the hauling vehicle.

When driving on hilly roads, the above said unacceptably great downwardly or upwardly directed force on the hauling vehicle imparts much too great a downwardly directed force on the hauling vehicle which force must be absorbed by the suspension and possibly the tires of the hauling vehicle and this causes much too great wear and tear on the hauling vehicle and also unacceptably great axial load to the detriment of the road in the form of spreading of the road surface. When the semi-trailer exerts an unacceptably great upwardly directed force on the hauling vehicle, the axial load of the hauling vehicle is reduced and, in critical situations, the tractive force between hauling wheels and road is substantially reduced in consequence, so that in unfavorable situations, the hauling vehicle with semi-trailer may be forced to a standstill. Up to the present time, the said disadvantages of semi-trailers, having a plurality of wheel axles arranged one after the other and extending over a substantial part of the length of the semi-trailer, have been avoided by constructing the semi-trailer in the same way as a trailer and by effecting coupling to the hauling vehicle in the same way as in conventional trailer couplings, in other words, to the rear of the hauling vehicle, whereby the hauling vehicle and trailer can move freely with respect to each other and the above said disadvantages do not occur when driving on hilly roads. With such a solution, however, none of the weight of the trailer is transmitted to the hauling vehicle and this must therefore be provided with a load in order to increase the friction of the wheels against the road surface, which means that "dead weight" must be carried.

The provision of a plurality of wheel axles to semi-trailers and trailers is due to the requirements of Road Authorities to decreased axial load in order to protect the road system with the increasing transport of goods by means of hauling vehicles and various forms of trailer. Particularly in the transport of large, heavy objects which cannot be divided into smaller components, such as excavators, transformers, etc., it is desirable that the loading platform of the trailer is low so as to facilitate the loading of excavators and other large and heavy goods, and also that the centre of gravity of the loaded trailer is as low as possible. A low-lying trailer is obtained primarily by utilizing wheels of relatively small diameter which also means that a plurality of wheel axles must be utilized in order not to exceed a determined surface load on the road at a given load of the trailer. This is due to the fact that a wheel of small diameter has a less effective bearing surface on the road surface than a wheel of larger diameter. A trailer that is equipped with a plurality of wheel axles, arranged one after the other, is very rigid when driving on curves, and it is therefore conventional to construct such trailers as semi-trailers whereby part of the load of the semi-trailer is transmitted to the hauling vehicle via the coupling by means of rotatable coupling disc and, at the same time, the hauling vehicle guides the semi-trailer by direct lateral affect on the frame thereof. To facilitate the guiding of the semi-trailer, it is known to arrange one or other form of automatic steering at one or several of the axles.

In accordance with the present invention, and in order to eliminate the above said disadvantages of hauling vehicles with semi-trailers, the fifth wheel is arranged such that it can be raised and lowered with respect to the frame of the hauling vehicle or, alternatively, to the gooseneck of the semi-trailer, by means of a power device which is adapted to exert a predetermined upwardly-directed or downwardly-directed force, respectively, on the coupling such that when driving on hilly roads the downwardly or upwardly directed force exerted by the semi-trailer on the hauling vehicle via the coupling is absorbed by the power device and maintained substantially constant at the selected value, whereby substantially constant axial load of the drive wheels of the hauling vehicle is maintained.

This is achieved in that the coupling in a preferred embodiment includes a frame upon which the fifth wheel is arranged and which, at its leading end is pivotally connected to the frame of the hauling vehicle about a transverse, horizontal axis, and in that the power device comprises a plurality of pressure-fluid operated power devices which are arranged between the said frames. The frame of the coupling is supported laterally against the longitudinal frame beams of the hauling vehicle by means of vertical, cooperating slides surfaces provided thereon, whereby the mounting of the frame in the frame of the hauling vehicle is not subject to forces which attempt to twist the bearings of the frame horizontally.

To facilitate the guiding of the semi-trailer which, in an embodiment example described in the description, is provided with six axles, the first wheel axle and the two last axles are preferably provided with automatic steering which allows the semi-trailer to follow very closely in the tracks of the hauling vehicle the point of rotation of the semi-trailer being at or adjacent the third axle, calculated from the leading end.

The characterizing features of the described hauling vehicle with semi-trailer will be clear from the subsequent claims, and an embodiment example is further described hereinbelow with reference to the drawing where:

FIG. 1 is a lateral view of the hauling vehicle with semi-trailer,

FIG. 2 is a view of the hauling vehicle with coupling and leading portion of the semi-trailer, FIG. 3 is a view of the frame of the hauling vehicle with coupling, viewed from above, FIGS. 4 and 5 are the same view as FIG. 2 with the semi-trailer on a horizontal surface, the hauling vehicle being driven onto a downwardly inclined surface and upwardly inclined surface respectively, with corresponding displacement of the frame of the coupling, and FIG. 6 is the same view as FIG. 2, but with the coupling arranged such that it is capable of being raised and lowered with respect to the coupling bar of the semi-trailer.

FIG. 1 is a view of a hauling vehicle 1 and semi-trailer 2 interconnected by means of the coupling 3. The semi-trailer is provided with six axles or pairs of wheels, which cause it to be very rigid with respect to steering on curved roads and also when driving in hilly terrain. If the coupling 3 is rigidly mounted on the hauling vehicle 1, or is not arranged to be capable of moving in a vertical direction during driving, the semi-trailer, due to its rigidity, i.e. its inability to follow the upward and downward movement, respectively, of the hauling vehicle, exerts and unacceptably great load on the hauling vehicle when this is driven onto an upwardly inclined surface 5' from horizontal surface 5; the said surface 5' being indicated by broken lines in FIG. 1. If the hauling vehicle is driven onto a downwardly inclined surface 5'', indicated by broken lines in FIG. 1, the downwardly acting pressure of the semi-trailer on the hauling vehicle is decreased since the semi-trailer attempts to maintain its horizontal position determined by the horizontal surface 5 whereby, in some cases, the driving wheel 6 of the hauling vehicle 1 may have too little bearing pressure against the surface and may spin therefore, and, in unfavorable situations, the hauling vehicle with semi-trailer may be forced to a standstill. In order to eliminate the said disadvantages, the coupling 3 is provided with a frame 7 which, at its leading end, it pivotally mounted in the frame 8 of the hauling vehicle 2 about a shaft or bolts 9. Pneumatic or hydraulic power devices 10 are arranged between the frame 7 of the coupling and the frame 8 of the hauling vehicle, said power devices being in communication with a power source capable of distributing a pressurized fluid at a determined pressure, and of receiving the said pressurized fluid at a somewhat higher pressure when the frame 7 is caused to pivot upwardly and downwardly due to external forces. An appropriate fluid pressure control and fluid supply system for the present invention is conventional. For example, reference is made to U.S. Pat. No. 3,203,711 (columns 3 and 4) which discloses a pneumatic means for maintaining a constant force in the pneumatic components which support a pair of wheels on a trailer. Such a pneumatic system might obviously be used in connection with the present invention. U.S. Pat. No. 3,055,677 (column 4) also discloses a suitable fluid pressure control and supply system. The external force is of course the pressure exerted by the gooseneck 11 of the semi-trailer 2 when driving on the described hilly road. FIG. 4 shows how the frame 7 with fifth wheel is forced downwardly during compression of the power devices 10 when the hauling vehicle 2 drives onto an upwardly inclined surface 5' from a horizontal surface 5. Due to the downward pivoting of the frame 7 against the constant force exerted by the power device 10, overloading of the suspension and drive wheels of the hauling vehicle which has hitherto been general is avoided and a constant and predetermined pressure is maintained between the semi-trailer and hauling vehicle and thereby a constant pressure between the driving wheels of the hauling vehicle and the road surface. FIG. 5 shows the hauling vehicle driven from the horizontal surface 5 onto the downwardly inclined surface 5''. It will be seen that the frame 7 is raised with respect to a central position, as shown in FIG. 2, where both hauling vehicle and semi-trailer are disposed on a horizontal surface 5, the power devices 10 maintaining the predetermined pressure between semi-trailer and hauling vehicle. The angle of the surfaces 5' and 5'' with respect to the horizontal surface 5 are indicated by $\alpha$ and $\beta$ respectively.

FIG. 2 shows, as described hereinabove, the hauling vehicle 1 and semi-trailer 2 on a horizontal surface 5, the frame 7 of the coupling being thereby in a central position, the power devices 10 exerting the upwardly directed and previously selected force to maintain a constant pressure between semi-trailer and hauling vehicle and between the driving wheels of the hauling vehicle and the road surface. The frame 7 is supported laterally by means of vertical slide surfaces 12 arranged on the frame 8 of the hauling vehicle, said slide surfaces cooperating with optional, corresponding slide surfaces of the frame 7. The said slide surfaces may be provided with automatic lubrication in order to reduce any wear and friction between the surface caused by dust and other particles stirred up from the road surface when driving. The power devices 10 can to advantage be disposed as illustrated in FIG. 3, viz. with a power device between the shaft or bolts 9 of the frame 7 and the fifth wheel 13, two power devices 10 being disposed on either side of the frame 7 to the rear of the fifth wheel 13.

In a preferred embodiment of the semi-trailer 2 with six wheel axles, the first pair of wheels and the two last pairs of wheels are provided with automatic steering of any suitable type, it being thereby achieved that the semi-trailer, when driving on curved roads, turns approximately about the third wheel axle calculated from the leading end. In this way, the semi-trailer follows very closely the tracks of the hauling vehicle so that the hauling vehicle with semi-trailer is driven with facility on relatively narrow hilly roads.

An alternative embodiment of the coupling 3 is illustrated in FIG. 6. The first component of the coupling device 3 which includes the fifth wheel 13 is rigidly mounted on the frame 8 of the hauling vehicle 1. The second component (not illustrated) of the coupling 3 is mounted on the frame 7, said alternative embodiment being mounted below the gooseneck 11 of the semi-trailer 2 and has its rear end rotatably supported in said gooseneck by means of a shaft or bolts 9. The power devices 10 are arranged between the gooseneck 11 and the frame 7 for the same purpose and effect as described hereinbefore.

It is thereby achieved that a semi-trailer with a coupling according to the invention can be utilized together with conventional hauling vehicles where the fifth wheel is rigidly mounted on the frame 8 of the hauling vehicle.

In this embodiment example, the power device 10 must be connected to the hydraulic or pneumatic power source of the hauling vehicle, the desired pressure being achieved by means of a pressure regulator. The semi-trailer can optionally be provided with separate pressure source such that the coupling arrangement between hauling vehicle and semi-trailer is independent of the pneumatic or hydraulic power source of the hauling vehicle.

Having described my invention, I claim:

1. An improved hitch for use between a frame section of a semi-trailer and a frame section of a hauling vehicle, the hitch comprising:
   a frame pivotally mounted at one end thereof to one of the frame sections;
   movable means connected between the frame and the other frame section for coupling the semi-trailer to the hauling vehicle; and fluid powered means vertically movable and connected between the frame and the first mentioned frame section for maintaining a constant predetermined vertical force between the semi-trailer and the hauling vehicle during traversal of road inclines which results in the exertion, by the wheels of the hauling vehicle, of a relatively constant pressure on a road during such traversals.

2. The subject matter of claim 1 wherein the first mentioned frame section is the forward gooseneck portion of the hauling vehicle, and further wherein the second mentioned frame section is the rearward frame section of the semi-trailer.

3. The subject matter of claim 1 wherein the first mentioned frame section is the rearward frame section of the semi-trailer, and further wherein the second mentioned frame section is the forward gooseneck portion of the hauling vehicle.

4. The subject matter of claim 2 wherein the movable means comprises a coupling having first and second components rotatable about each other, along two orthogonal axes.

5. The subject matter of claim 3 wherein the movable means comprises a coupling having first and second components rotatable about each other, along two orthogonal axes.

6. The subject matter of claim 4 wherein the fluid powered means comprises a plurality of spaced units, each unit being vertically movable and connected between the frame and the first mentioned frame section.

7. The subject matter of claim 5 wherein the fluid powered means comprises a plurality of spaced units, each unit being vertically movable and connected between the frame and the first mentioned frame section.

\* \* \* \* \*